United States Patent Office 3,239,564
Patented Mar. 8, 1966

3,239,564
2 N-SUBSTITUTED AMINO HALOBENZO-PHENONES
Earl Reeder, 398 Walnut St., Nutley, N.J., and Leo Henryk Sternbach, 10 Woodmont Road, Upper Montclair, N.J.
No Drawing. Filed Nov. 20, 1961, Ser. No. 154,927
Claims priority, application Switzerland, Dec. 2, 1960, 13,495/60
5 Claims. (Cl. 260—570)

This invention relates to novel 5-aryl-3H-1,4-benzodiazepin-2(1H)-ones, novel derivatives thereof and novel intermediates therefor; and processes of making the foregoing. The present application is a continuation-in-part of Serial No. 858,564, filed December 10, 1959, and now abandoned; Serial No. 858,597, filed December 10, 1959, and now U.S. Patent No. 3,051,701 and Serial No. 75,690, filed December 14, 1960, and now abandoned.

The novel 5-aryl-3H-1,4-benzodiazepin-2(1H)-ones and derivatives thereof to which the invention relates are selected from the group consisting of compounds of the formula (I)

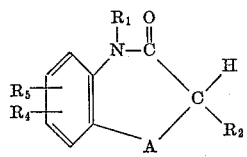

and pharmaceutically acceptable salts thereof, wherein A is selected from the group consisting of

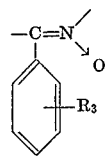

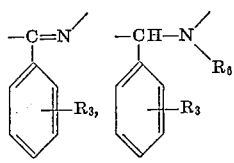

and

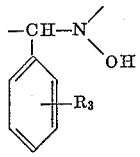

$R_1$ is selected from the group consisting of lower alkyl, lower alkenyl, and aralkyl; $R_2$ is selected from the group consisting of hydrogen, lower alkyl, lower alkoxy-lower alkyl, phenyl and hydroxybenzyl; $R_3$, $R_4$ and $R_5$ are selected from the group consisting of hydrogen, halogen and lower alkyl; and $R_6$ is selected from the group consisting of hydrogen, lower alkyl, lower alkenyl and lower alkynyl.

As is evident from the above, the novel 5-aryl-3H-1,4-benzodiazepin-2(1H)-ones of the invention can be particularized as being compounds of the following structural formulas (II)

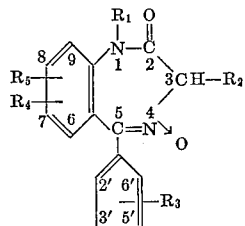

(III)

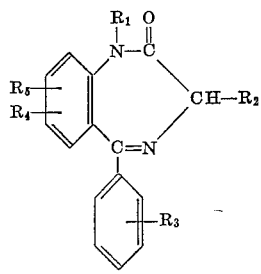

and their respective 4,5-dihydro derivatives.

The 4,5-dihydro derivatives of the compounds represented by Formula II above are represented by the following formula (IV)

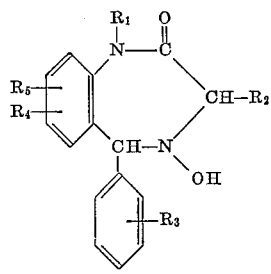

and similarly the 4,5-dihydro derivatives of compounds represented by Formula III above can be represented by the following formula (V)

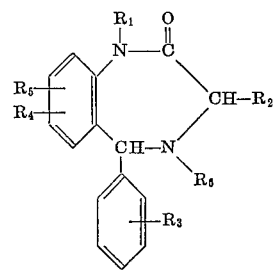

The numbering of the benzodiazepine ring system is shown in Formula II above for the purposes of convenience. The symbols R in the above Formulas I–V inclusive have the following significance. $R_1$ is selected from the group consisting of lower alkyl, lower alkenyl, and aralkyl; $R_2$ is selected from the group consisting of hydrogen, lower alkyl, lower alkoxy-lower alkyl, phenyl and hydroxybenzyl; $R_3$, $R_4$ and $R_5$ are selected from the group consisting of hydrogen, halogen and lower alkyl; $R_6$ is selected from the group consisting of hydrogen, lower alkyl, lower alkenyl and lower alkynyl.

In addition to the compounds within the scope of Formulas I–V above there are also encompassed within the invention the pharmaceutically acceptable salts of said compounds. Certain compounds of the above formula form pharmaceutically acceptable acid addition salts and pharmaceutically acceptable quaternary ammonium salts. Thus the basic compounds of the invention, i.e. the compounds of Formulas III, IV and V above, form pharmaceutically acceptable acid addition salts with inorganic and organic acids; i.e. the hydrohalic acids such as hydrochloric acid and hydrobromic acid; with other mineral acids such as sulfuric acid, phosphoric acid, nitric acid and the like; and with organic acids such as tartaric acid, citric acid, camphorsulfonic acid, ethanesulfonic acid, toluenesulfonic acid, salicylic acid, ascorbic acid, maleic acid, succinic acid, mandelic acid, formic acid, acetic acid, and the like. Also the compounds containing a tertiary amino nitrogen atom in the 4-position, i.e. the compounds of Formula V wherein $R_6$ is other than hydrogen, form pharmaceutically acceptable quaternary salts with conventional quaternizing agents, such as lower alkyl halides; and the like.

As used in this disclosure the terms herein below defined have the following significance. The term lower alkyl refers to such straight chain and branched chain lower alkyl groups as methyl, ethyl, propyl, isopropyl, butyl, isobutyl, t-butyl and the like. The term lower alkenyl refers to groups such as allyl, butenyl (including the various isomers and the like. The term lower alkynyl refers to groups such as propargyl, and the like. The term lower alkoxy-lower alkyl refers to groups such as methoxymethyl, and the like. The term halogen refers to all four halogens, i.e., iodine, bromine, chlorine and fluorine. The term α-halo-lower alkanoyl refers to acyl groups bearing a halogen substituent on the α-carbon atom, i.e., groups such as chloroacetyl, bromoacetyl, α-bromopropionyl, and the like.

The following paragraphs contain a general outline of the processes of the invention and represent merely a synopsis of all the processes of the invention. These processes are set forth in detail in the examples of this disclosure. The novel processes and intermediates, as well as the products corresponding to Formula I (i.e. to Formulas II–V) are part of the invention.

The compounds of Formula II may be synthesized by several methods, for example a 2-aminobenzophenone can be reacted with hydroxylamine or a salt thereof, such as hydroxylamine hydrochloride, in a medium such as ethanol, to form a 2-aminobenzophenone oxime, which can then be acylated with an α-halo-lower alkanoyl halide in the presence of a base, e.g. an alkali hydroxide, for example an alkali metal hydroxide such as sodium hydroxide. This reaction yields a 2-(α-halo-lower alkanoylamino)-benzophenone oxime which, after further treatment with one mole of base, is converted to a 5-phenyl-3H-1,4-benzodiazepin-2(1H)-one 4-oxide (represented by Formula II).

Oxidation of a 5-phenyl-3H-1,4-benzodiazepin-2(1H)-one (the methods of synthesis of which will be outlined below) with hydrogen peroxide provides still another route to the compounds of Formula II.

The compounds of Formula III (i.e. 5-phenyl-3-H-1,4-benzodiazepin-2(1H)-ones) can also be prepared by a variety of methods. For example a 5-phenyl-3H-1,4-benzodiazepin-2(1H)-one 4-oxide can be reduced with phosphorus trichloride or with hydrogen in the presence of a Raney nickel catalyst. Compounds corresponding to Formula III can also be produced by reacting a 2-aminobenzophenone with an α-halo-lower alkanoyl halide to form a 2-(α-halo-lower alkanoylamino)-benzophenone, which can then be reacted with ammonia in alcoholic solution to yield the final product. Still another method is by cyclizing a 2-(aminoacetamido)-benzophenone. These compounds, i.e., the 2-(aminoacetamido)-benzophenones, are not a part of the present invention but their preparation is set forth in the examples below in order that the present disclosure may be complete. These 2-(aminoacetamido)-benzophenones can cyclize spontaneously to form compounds corresponding to Formula III. For example, a 2-(amino-acetamido)-benzophenone can be placed in a suspension of methanolic ammonia and subsequently, after a period of several hours, for example overnight, the corresponding benzodiazepine represented by Formula III can be recovered. The cyclization can be accelerated by heating. The heating can be accomplished by heating the 2-(aminoacetamido)-benzophenone compound per se or said compound can be dissolved in an inert organic solvent and then heated.

The compounds of Formula III can also be prepared directly from a 2-aminobenzophenone via reaction with an α-amino acid. In those compounds wherein $R_2$ is hydrogen, the α-amino acid utilized is glycine. This reaction, i.e., of 2-aminobenzophenone with an α-amino acid, is equally capable of being carried out with an α-amino acid ester, for example a lower alkyl ester of an α-amino acid. Thus where $R_2$ is hydrogen, a 2-aminobenzophenone can be reacted either with glycine or glycine ethyl ester to obtain a compound corresponding to Formula III. Where $R_2$ is other than hydrogen, α-amino acids having the formula $R_2$—$CH_2$—($NH_2$)—COOH, and esters of such acids, are used to introduce the group $R_2$ into the final compound. Typical α-amino acids used in this process wherein $R_2$ is other than hydrogen are, for example, alanine, tyrosine, α-amino-phenylacetic acid and the like. The above reactions, both where $R_2$ is hydrogen and is not hydrogen, are preferably effected in a solvent such as pyridine, dimethylformamide, and the like. It is also preferable to utilize one of the materials, or a fraction thereof, present in the form of the salt of a strong organic or inorganic acid, such as glycine hydrochloride, glycine ethyl ester hydrochloride and pyridine hydrochloride.

The 4,5-dihydro derivatives corresponding to Formulas IV and V can be produced respectively from the compounds of Formulas II and III by reduction. For example, compounds corresponding to Formula II can be reduced with hydrogen in the presence of a platinum oxide catalyst to yield 4-hydroxy-5-phenyl-4,5-dihydro-3H-1,4-benzodiazepin-2(1H)-ones corresponding to Formula IV and compounds corresponding to Formula III above can be similarly reduced to yield compounds corresponding to Formula V wherein $R_6$ is hydrogen.

The compounds of II–V can be obtained directly from 2-(N-substituted)-aminobenzophenones. Compounds of Formula V wherein $R_1$ is as above and $R_6$ is hydrogen can be converted into corresponding compounds wherein $R_6$ is other than hydrogen by reaction with lower alkyl halide, lower alkenyl halide or lower alkynyl halide. Using an excess of lower alkyl, lower alkenyl or lower alkynyl halide and prolonged heating with a sodio derivative of a compound of Formula V wherein $R_6$ is hydrogen, results in the 1,4-disubstituted compound wherein $R_6$ is selected from the group consisting of lower alkyl, lower alkenyl, and lower alkynyl. Further, this disubstituted compound can also be obtained by heating a compound wherein $R_1$ is other than hydrogen and $R_6$ is hydrogen with an excess of lower alkyl halide, lower alkenyl halide or lower alkynyl halide.

The 2-aminobenzophenone compounds used as starting materials in numerous processes of the invention can themselves be prepared by a variety of methods. Novel 2-aminobenzophenone compounds produced by the methods of the invention and used in the syntheses of the invention are a part of the invention. In one method of preparing the 2-aminobenzophenone compounds a 2-acetamidobenzoic acid or a 2-aminobenzoic acid can be reacted with acetic anhydride to form a 2-methyl-4H-3,1-benzoxazin-4-one which can then be reacted with a Grignard agent, for example, a phenyl Grignard reagent such as phenyl magnesium bromide, to form a 2-acetamidobenzophenone. 2-acetamidobenzophenone compounds can be hydrolyzed by standard methods, such as by the use of ethanol and hydrochloric acid, to yield a 2-aminobenzophenone. Another method of preparing the 2-aminobenzophenones is to condense a benzoyl halide with an aniline compound, and then hydrolyze the formed intermediate to obtain the desired product.

2-aminobenzophenones wherein the nitrogen atom bears alkyl, alkenyl and aralkyl substituents can be formed by reacting a 2-aminobenzophenone with tosylchloride to form a 2-tosylamidobenzophenone. The hydrogen atom of the tosylamino group can be replaced by the desired substituent and the desired N-substituted 2-aminobenzophenone obtained by subsequently splitting off the tosyl group. One way of splitting off the tosyl group is by heating the N-substituted 2-aminobenzophenone in the presence of acid.

The compounds represented by Formula I (i.e., to Formulas II–V) inclusive are useful as sedatives, muscle relaxants and anticonvulsants. They can be administered by incorporating therapeutic dosages in a conventional liquid or solid vehicle, to provide elixirs, suspensions, capsules, tablets, powders and the like, according to accepted pharmaceutical practice. The various compounds corresponding to Formula I are also useful as intermediates in the synthesis of other compounds corresponding to Formula I, as discussed above and illustrated in the examples.

In the following examples the temperatures referred to are all in the centigrade scale.

The following examples illustrate the compounds and processes of the invention.

Example 1

500 g. of p-bromoaniline were added with stirring at 120° to 995 g. of p-toluoyl chloride, causing a strong evolution of hydrogen chloride. The mixture solidified and was molten by heating to 200°. 500 g. of anhydrous zinc chloride were added with stirring causing again the evolution of hydrogen chloride. The mixture was heated for 2 hours to 230° and then poured with stirring into 2 liters of 0.5 N hydrochloric acid. The precipitated solid was filtered off, pulverized, suspended in 4 liters of 0.5 N hydrochloric acid and refluxed for one hour. The mixture was cooled. The wet resinous material was filtered off and dissolved in a mixture of 1.5 liters of acetic acid and 0.75 liter of concentrated hydrochloric acid. The solution was refluxed for 18 hours and concentrated in vacuo. To the residue were added 3 liters of benzene and an excess of sodium hydroxide. The precipitated p-toluic acid sodium salt was filtered off and the aqueous layer discarded. The benzene layer was washed with 2 N sodium hydroxide and then with an excess of 2 N hydrochloric acid. The benzene layer was dried and concentrated, yielding crude 2-amino-5-bromo-4′-methylbenzophenone. After crystallization from a mixture of benzene and petroleum ether, the product formed yellow plates melting at 105–106°.

A mixture of 50 g. of 2-amino-5-bromo-4′-methylbenzophenone, 28 g. of hydroxylamine hydrochloride and 250 ml. of alcohol was refluxed for 15 hours. The solution was neutralized with aqueous sodium carbonate, diluted with 100 ml. of water and 100 ml. of benzene. The precipitated crystals of 2-amino-5-bromo-4′-methylbenzophenone α-oxime were filtered off. From the filtrate the benzene layer was separated, dried and partly concentrated in vacuo yielding an additional quantity of the product. The mother liquors were diluted with petroleum ether to obtain 2-amino-5-bromo-4′-methylbenzophenone β-oxime. The α-oxime was crystallized from ether and melted at 204–205°. The β-oxime was crystallized from a mixture of benzene and petroleum ether and melted at 115–116°.

Into a stirred, cooled solution (10–15°) of 9.15 g. of 2-amino-5-bromo-4′-methylbenzophenone α-oxime in 45 ml. of dioxane were introduced in small portions 3 ml. of chloracetyl chloride and an equivalent amount of 3 N sodium hydroxide. The chloracetyl chloride and sodium hydroxide were added alternately at a rate so as to keep the temperature below 15° and the mixture neutral or slightly alkaline. After 30 minutes, the mixture was acidified to pH 5 with dilute hydrochloric acid, diluted with water and extracted with ether. The ether extract was dried, concentrated in vacuo and the oily residue was crystallized by the addition of ether. The product, 2-chloracetamido-5-bromo-4′-methylbenzophenone α-oxime, crystallized from dioxane in the form of colorless prisms melting at 179–180°.

A solution of 3 g. of 2-chloracetamido-5-bromo-4′-methylbenzophenone α-oxime in 25 ml. of boiling acetic anhydride was cooled to 75° and saturated with hydrogen chloride. The mixture was left at room temperature for 30 minutes, heated again for 2 hours at 75°, saturated again with hydrogen chloride and concentrated in vacuo. The residue was crystallized from a mixture of methylene chloride and petroleum ether forming yellow needles of 6-bromo-2-chloromethyl-4-(p-tolyl)-quinazoline 3-oxide, melting at 162–164°.

20 g. of 6-bromo-2-chloromethyl-4-(p-tolyl)-quinazoline 3-oxide were added in portions at 0° to 150 ml. of a 50% solution of methylamine in methanol. The reaction mixture was stirred at room temperature for one hour, then cooled to 5° and filtered. The reaction product remaining on the filter, 7-bromo-2-methylamino-5-(p-tolyl)-3H-1,4-benzodiazepine 4-oxide, was recrystallized from ethanol forming yellow prisms melting at 255–256°.

A solution of 3 g. of 7-bromo-2-methylamino-5-(p-tolyl)-3H-1,4-benzodiazepine 4-oxide in a mixture of 16 ml. of pyridine and 16 ml. of acetic anhydride was left at room temperature for 16 hours. The precipitated starting material was filtered off and the mother liquors were concentrated in vacuo. The residue was crystallized by the addition of ether, petroleum ether and acetone. After recrystallization from a mixture of acetone and petroleum ether, the product, 7-bromo-2-(N-methyl-acetamido)-5-(p-tolyl)-3H-1,4-benzodiazepine 4-oxide, formed colorless needles melting at 209–210°.

3 ml. of 1 N hydrochloric acid were added at room temperature to a solution of 1.2 g. (3 mmol) of 7-bromo-2-(N-methyl-acetamido)-5-(p-tolyl)-3H-1,4 - benzodiazepine 4-oxide in 30 ml. of alcohol. The mixture was refluxed for one hour, partly concentrated in vacuo and diluted with ice water. The crystalline reaction product precipitated out, was filtered off and recrystallized from a mixture of methylene chloride and petroleum ether. The 7-bromo-5-(p-tolyl)-3H-1,4-benzodiazepin - 2(1H)-one 4-oxide formed colorless plates melting at 237–238°.

Example 2

To 500 g. of molten p-chloraniline heated to 120° were added with stirring 750 ml. of p-chlorobenzoyl chloride, causing a violent evolution of hydrogen chloride. The mixture then solidified and was molten by heating to 200°. At this temperature, 500 g. of anhydrous zinc chloride were introduced. The stirring was continued and the mixture was heated at 230–242° for 2 hours. It was then poured into one liter of 0.5 N hydrochloric acid. The precipitated solid was filtered off, pulverized, suspended in one liter of 0.5 N hydrochloric acid and refluxed for one hour. The mixture was then cooled. The resinous material was filtered off and dissolved in a mixture of 14 liters of acetic acid and 3 liters of concentrated hydrochloric acid. The solution was refluxed for 18 hours and concentrated in vacuo. The residue was dissolved in 4 liters of benzene and stirred with an excess of alkali. The precipitated sodium p-chlorobenzoate was filtered off and the benzene solution concentrated to obtain the crude product. The 2-amino-5,4′-dichlorobenzophenone was crystallized from alcohol to obtain yellow needles melting at 118–119°.

A solution of 169 g. of 2-amino-5,4′-dichlorobenzophenone and 73 g. of hydroxylamine hydrochloride in 730 ml. of alcohol was refluxed for 16 hours. The solution was concentrated in vacuo. The residue was diluted with water and ether and neutralized with 40% sodium hydroxide. The ether layer was separated, dried with sodium sulfate and concentrated in vacuo. The residue was dissolved in 100 ml. of benzene and crystallized by the gradual addition of about 2 liters of petroleum ether. The crystalline mixture was cooled for 14 hours at 5°. The precipitated crude 2-amino-5,4'-dichlorobenzophenone oxime was dissolved in 900 ml. of boiling benzene and treated with charcoal. The hot mixture was filtered and the oxime was crystallized by the addition of 1,000 ml. of petroleum ether. After crystallization from a mixture of benzene and petroleum ether, the pure α-oxime was obtained in the form of colorless prisms, melting at 151–154°.

15 ml. of chloracetyl chloride were added over a period of ½ hour to a 50° solution of 28 g. of 2-amino-5,4'-dichlorobenzophenone α-oxime in 250 ml. of glacial acetic acid. The mixture was left at room temperature for 14 hours and then concentrated in vacuo. The residue was dissolved in hot methylene chloride and washed with ice cold sodium hydroxide and water. The organic layer was separated, dried and concentrated in vacuo to about 300 ml. It was then diluted with 600 ml. of petroleum ether and cooled. The reaction product, 6-chloro-2-chloromethyl-4-(4-chlorophenyl)-quinazoline 3-oxide, crystallized in fine yellow needles melting at 163–164°.

27 g. of 6-chloro-2-chloromethyl-4-(4-chlorophenyl)-quinazoline 3-oxide were added in portions at 0° to 150 ml. of a 50% solution of methylamine in methanol. The reaction mixture was stirred at room temperature for 19 hours, then cooled to 5° for 6 hours and filtered. The reaction product remaining on the filter was recrystallized from ethanol to obtain yellow prisms of 7-chloro-2-methylamino-5-(4-chlorophenyl)-3H-1,4-benzodiazepine 4-oxide melting at 254–255°.

40 ml. of acetic anhydride were added at room temperature to a solution of 6 g. of 7-chloro-2-methylamino-5-(4-chlorophenyl)-3H-1,4-benzodiazepine 4-oxide in 50 ml. of pyridine. After 15 hours, a small amount of starting material which had precipitated out was filtered off. The solution was then concentrated in vacuo to a small volume, diluted with methylene chloride and washed with ice cold dilute sodium hydroxide and acid. The methylene chloride solution was then dried, concentrated in vacuo and the residue crystallized from acetone. The product, 7-chloro-2-(N-methylacetamido)-5-(4-chlorophenyl)-3H-1,4-benzodiazepine 4-oxide, formed colorless plates melting at 191–192°.

4 ml. of 1 N hydrochloric acid were added at room temperature to a solution of 1.4 g. (4 mmol.) of 7-chloro-2-(N-methylacetamido)-5-(4-chlorophenyl)-3H-1,4-benzodiazepine 4-oxide in 30 ml. of alcohol. The mixture was refluxed for one hour, partly concentrated in vacuo and diluted with ice water. The crystalline reaction product, 7-chloro-5-(4-chlorophenyl)-3H-1,4-benzodiazepin-2(1H)-one 4-oxide, was filtered off and recrystallized from methanol in the form of colorless plates melting at 250–252°.

*Example 3*

A solution of 60.2 g. of 2-acetamido-5-chlorobenzophenone in a mixture of 137 ml. of acetic acid and 82 ml. of nitric acid was saturated with hydrogen chloride. The mixture was left at room temperature for one hour and then diluted with water and extracted with methylene chloride. The methylene chloride solution was washed with water, dried, and concentrated in vacuo. The residue was dissolved in ether and crystallized by the addition of petroleum ether to obtain colorless prisms of 2-acetamido-3,5-dichlorobenzophenone melting at 143–144°.

A mixture of 72 g. of 2-acetamido-3,5-dichlorobenzophenone, 600 ml. of alcohol and 600 ml. of concentrated hydrochloric acid was refluxed for 3 hours, then diluted with ice, made alkaline with dilute sodium hydroxide and extracted with ether. The ether solution was dried and concentrated. The product, 2-amino-3,5-dichlorobenzophenone, was crystallized from a mixture of ether and petroleum ether forming yellow prisms melting at 93–94°.

A mixture of 18.5 g. of 2-amino-3,5-dichlorobenzophenone, 14 g. of glycine ethyl ester hydrochloride and 150 ml. of pyridine was refluxed. After 3 hours, 20 ml. of pyridine were distilled off and 14 g. of glycine ethyl ester hydrochloride were added. The reaction mixture was refluxed for an additional 15 hours, concentrated in vacuo and then diluted with ether and water. The reaction product, 7,9-dichloro-5-phenyl-3H-1,4-benzodiazepin-2(1H)-one, crystallized out, was filtered off and recrystallized from acetone, M.P. 207–208°.

*Example 4*

To a stirred suspension of 58 g. (0.25 mol) of 2-dimethylformamidinoanthranilic acid hydrochloride in 750 cc. of chlorobenzene was added in portions 60 g. of phosphorus pentachloride. The mixture was heated on the steam bath for 2 hours and cooled in ice to 10°. 135 g. of aluminum chloride was added in 4 portions, keeping the temperature of the reaction mixture below 10°. After completion of the addition of the aluminum chloride, the mixture was heated on the steam bath for 3 hours at 95°.

The reaction mixture was cooled in ice and 400 g. of crushed ice was added in portions, keeping the temperature below 40°. Next, 500 cc. of 40% sodium hydroxide was added dropwise, again keeping the temperature of the reaction mixture below 40°. The pH at this point was about 11. Heating on the steam bath at 95° for 4 hours followed, then cooling to 40°. The mixture was transferred to a separatory funnel and the chlorobenzene phase was separated. The aqueous phase was extracted with three 100 cc. portions of chlorobenzene and the combined chlorobenzene phases were concentrated in vacuo on the steam bath, yielding an oily residue. The oil was refluxed with stirring in a mixture of 150 cc. of ethanol, 75 cc. of water and 75 cc. of 10% sodium hydroxide for 24 hours. The solvents were distilled off at atmospheric pressure, the mixture was cooled and 500 cc. of water was added dropwise with stirring. After standing in the refrigerator overnight, the solid yellow product, 2-amino-4'-chlorobenzophenone, was filtered off, sucked dry, dried in vacuo at room temperature over sodium hydroxide, then crystallized from 200 cc. of hot ethanol in the form of yellow needles, M.P. 98–99°.

A stirred mixture of 15.5 g. (0.067 mol) of 2-amino-4'-chlorobenzophenone, 35 cc. of pyridine and 15 g. (0.1 mol) of glycine ethyl ester hydrochloride was slowly distilled at 115–120°, with the pyridine being replaced dropwise to keep the volume unchanged. After 5 hours, the reaction mixture was concentrated to dryness in vacuo. The residue was heated on the steam bath with 50 cc. of benzene and 50 cc. of water. The extract was decanted and the residue was re-extracted with 50 cc. of benzene and 50 cc. of water. The insoluble brown precipitate was filtered off and sucked dry. The crude product, 5-(p-chlorophenyl)-3H-1,4-benzodiazepin-2(1H)-one, was recrystallized twice from ethanol to obtain white plates melting at 262–263°.

The 2-dimethyl formamidinoanthranilic acid hydrochloride used as a starting material in this example is not a part of the present invention, but the preparation thereof is disclosed below in order that the present disclosure may be complete.

137 g. (1 mol) of anthranilic acid was dissolved in 250 cc. dimethylformamide. The solution was cooled to 0° and 85 cc. (155 g.=1.3 mol) of thionyl chloride was added dropwise, keeping the temperature of the reaction mixture below 40°. After allowing the mixture to cool to room temperature, 750 cc. of acetone was added. It was then cooled to 0°. The white 2-dimethylformamidinoanthranilic acid hydrochloride which separated was filtered off, washed with 300 cc. of cold acetone and sucked dry.

*Example 5*

A solution of 75 g. of 2-acetamino-6-chlorobenzoic acid in 300 cc. of acetic anhydride was refluxed for 1 hr. The reaction mixture was then concentrated to dryness in vacuo and the residue crystallized from a mixture of benzene and hexane to give 5-chloro-2-methyl-4H-3,1-benzoxazine-4-one, which after recrystallization from benzene-hexane melted at 143.5–146°.

*Example 6*

A Grignard reagent prepared from 23.6 g. of brombenzene and 3.9 g. of magnesium in 400 cc. of ether was slowly added to an ice cold suspension of 29.3 g. of 5-chloro-2-methyl-4H-3,1-benzoxazine-4-one in 450 cc. of benzene and 150 cc. of ether. The brown suspension gradually turned to a tan-yellow. The reaction was stirred for 1 hr. in an ice bath after the addition of the Grignard reagent was completed and then stirred for 1 hr. at room temperature. After chilling to 0° in an ice-salt bath, the magnesium complex was decomposed by the careful addition of 250 cc. of 2 N hydrochloric acid. A white solid which proved to be N-acetyl-6-chloroanthranilic acid crystallized and was filtered off. The organic layer was separated and washed successively with water, dilute sodium hydroxide, and water, then dried over sodium sulfate and the solvent removed by distillation in vacuo. The residual oil of crude 2-acetamino-6-chlorobenzophenone was hydrolyzed by refluxing for 3 hrs. in 500 cc. of ethanol and 250 cc. of 6 N hydrochloric acid. After concentration to dryness in vacuo, the white crystalline residue was slurried with water, made alkaline with ammonia and extracted with benzene. An orange solid was obtained on evaporation of the benzene. Crystallization from hexane gave 2-amino-6-chlorobenzophenone, M.P. 101–102.5°.

*Example 7*

75 g. of 2-carboxy-6-chloracetanilide in 300 cc. of acetic anhydride was refluxed for 2 hrs. After concentration to dryness in vacuo, the residue was crystallized from benzene-hexane to give 8 - chloro - 2 - methyl-4H-3,1-benzoxazine-4-one, M.P. 131.5–132.5°.

*Example 8*

A Grignard reagent prepared from 23.6 g. of brombenzene and 3.9 g. of magnesium in 400 cc. of ether was slowly added to a solution of 29.3 g. of 8-chloro-2-methyl-4H-3,1-benzoxazine-4-one in 450 cc. of benzene and 150 cc. of ether keeping the temperature at 0–5° during the addition. The reaction mixture was stirred for an additional hour in an ice bath and then for 1 hr. at room temperature. After chilling to 0° in an ice-salt bath, the complex was decomposed by the slow addition of 250 cc. of cold 2 N hydrochloric acid. A white solid separated and was filtered off. The product (14.1 g.) melted at 158–159°. Several crystallizations increased the melting point to 189–190°. The infrared spectrum of this material is identical with that of 2-acetamino-3-chlorobenzoic acid. The organic layer was separated and washed successively with water, dilute sodium hydroxide and water, then dried over sodium sulfate. Following concentration to dryness, the residue was crystallized and recrystallized from methylene chloride-hexane to give 2-acetamino-3-chlorobenzophenone, M.P. 129–131°.

*Example 9*

A solution of 9.5 g. of 2-acetamino-3-chlorobenzophenone in 260 cc. of ethanol and 125 cc. of 6 N hydrochloric acid was refluxed for 7 hrs. The residue obtained after removal of solvent by distillation in vacuo was stirred with dilute ammonia and extracted with benzene. The benzene layer was dried over sodium sulfate and concentrated to dryness in vacuo leaving 9.3 g. of an orange residue. Crystallization from hexane gave 2-amino-3-chlorobenzophenone, M.P. 56.5–58°.

*Example 10*

A solution of 100 g. of 4-chloro-anthranilic acid in 500 ml. of acetic anhydride was refluxed for 30 minutes; then, about 300 ml. of a mixture of acetic acid and acetic anhydride was distilled off at normal pressure and the solid residue was dissolved in 500 ml. of warm benzene. The solution was concentrated to about 200 ml. and treated while still warm with 250 ml. of petroleum ether (60–70°). After standing for a few hours at 0°, the precipitated product 2-methyl-7-chloro-4H-3,1-benzoxazin-4-one was collected on a funnel, washed 3 times with 200 ml. of hexane and dried for 2 hours in vacuo at 65° C.

*Example 11*

First, a solution of phenyl magnesium bromide was prepared using 12.35 g. of magnesium, 76.0 g. of freshly distilled bromobenzene and 250 ml. of anhydrous ether. This was added while stirring and cooling in an ice bath over a period of one hour to a solution of 94.15 g. of 2-methyl-7-chloro-4H-3,1-benzoxazin-4-one. The resulting reaction mixture was stirred for one hour at room temperature and then poured onto a mixture of 112 g. of ammonium chloride and 900 g. of crushed ice. The mixture was left for about half an hour and stirred occasionally. Then the reaction product was extracted with 3 portions of 500 ml. of benzene each. After washing the benzene layers thoroughly with water and after drying over sodium sulfate, the solvent was distilled off in vacuo at 65° to give a solid residue. This was directly hydrolyzed by refluxing for one hour in 500 ml. of methanol and 500 ml. of 3 N sodium hydroxide solution. After cooling, the reaction mixture was extracted in 3 separatory funnels with a total of 2 l. of benzene. After washing the benzene extract with water and after drying over sodium sulfate, the solvent was distilled off in vacuo at 65° C. to give a brown oil. This was dissolved in petroleum ether (60–70°) and purified by chromatography on 580 g. of alumina ("Woelm" neutral; grade II). Petroleum ether was used as an eluant. The first 4 fractions (600 ml.) contained the 2-amino-4-chloro-benzophenone, which was crystallized from hexane at 0° as light yellow needles and melted at 84–85°.

*Example 12* o-Chlorobenzoylchloride (600 g.) was heated to 110° in a 5 l. three-necked flask equipped with thermometer, mechanical stirrer, and reflux condenser. To this p-chloroanilin (175 g.) was added under stirring. The mixture was then heated to 180° and zinc chloride (230 g.) was added. The temperature now was gradually raised to 220–230° and kept there until the HCl evolution had ceased (1–2 hours). After cooling to 120°, water was cautiously added and the mixture heated to reflux. The hot water layer was decanted and this procedure repeated 2 or 3 times.

The water insoluble brown mass was finally suspended in a mixture of 350 ml. water, 500 ml. acetic acid and 650 ml. conc. sulfuric acid and heated to reflux for 17 hours. After cooling, the homogeneous dark solution was poured into ice water, the mixture extracted with ether, the ether extract was neutralized with 2 N NaOH. Conc. of the ether solution and addition of a small amount of petroleum ether yielded 2-amino-2',5-dichlorobenzophenone in yellow crystals, which after recrystallization from ether petroleum ether yielded the pure compound, M.P. 88–89°.

*Example 13* o-Toluylchloride (100 g.) was heated to 100° in a three-necked flask equipped with thermometer, condenser, and mechanical stirrer. p-Chloroaniline (38 g.) was added and the mixture heated to 180° at which temperature ZnCl$_2$ (54 g.) was added. The temperature was now raised to 230° in the course of 1 hour and kept there for 1 hr. After cooling to 120°, water was cautiously added and the mixture heated to reflux. The hot water layer was decanted and the procedure repeated 5 times. The water insoluble material was refluxed for 17 hours with a mixture of 350 ml. 48% HBr and 350 ml. acetic acid. The dark solution was cooled and poured onto water. Extraction with ether, washing the ether with 2 N NaOH, and evaporating the solvent yielded a dark brown solution which was distilled at 0.2 mm. Between 150–160° a yellow viscous oil was collected. A sample was purified by gas chromatography and on scratching gave crystals of 2-amino-5-chloro-2'-methylbenzophenone which after recrystallization from heptane melted at 50–55°.

*Example 14*

A mixture of 176 g. (1.125 m.) of ortho-fluoro benzoyl chloride and 64 g. (0.5 m.) of para-chloroaniline was stirred and heated to 180° C., at which temperature 87 g. (0.64 m.) of zinc chloride was introduced, the temperature raised to 200–205° C. and maintained there for forty minutes. The golden colored melt was quenched by the careful addition of 500 ml. of 3 N hydrochloric acid and the resulting mixture refluxed for five minutes. The acid solution was decanted and the process repeated three times to remove all ortho-fluorobenzoic acid. The grey granular residue was dissolved in 300 ml. of 75% (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The methylene chloride extract was dried over anhydrous sodium sulphate and the solvent removed to give the crude aminobenzophenone. Recrystallization from methanol gave 2-amino-5-chloro-2'-fluorobenzophenone yellow needles (M.P. 94–95° C.).

*Example 15*

A mixture of 88 g. (0.556 m.) of m-fluorobenzoyl chloride, 32 g. (0.25 m.) of p-chloroaniline and 44 g. (0.324 m.) of zinc chloride was treated as in Example 14 to yield of 2-amino-5-chloro-3'-fluorobenzophenone, yellow needles, M.P. 90–91° C.

*Example 16*

The procedure used in this preparation was essentially that used in Examples 14 and 15. Reaction times and temperatures were varied as were hydrolysis conditions.

To a mixture of 580 g. (3.35 m.) of o-fluorobenzoyl chloride and 265 g. (1.54 m.) of p-bromoaniline at 180° C., 262 g. (1.93 m.) of zinc chloride was added with stirring. The temperature was raised to 195–205° C. and maintained there for two hours. The reaction mixture was quenched and washed with acid as in the previous experiments, and the residue was hydrolyzed for twenty hours with 1 liter of 60% (v./v.) sulphuric acid. The product, 2-amino-5-bromo-2'-fluorobenzophenone, was extracted as before, yielding yellow needles, M.P. 101–2° C.

*Example 17*

A solution of a mixture of 231.5 g. (1 mole) of 2-amino-5-chlorobenzophenone and 231.5 g. (1.2 moles) of p-tolylsulfonyl chloride in one liter of pyridine was refluxed for 1½ hours. Then 0.5 l. of pyridine was distilled off, and the residue was poured into water and stirred until the reaction product solidified. The solid material was filtered off and dissolved in 600 ml. of boiling benzene and converted into the sodium salt by the careful addition of 150 ml. of a 40% solution of sodium hydroxide. The stirring and refluxing was continued for 1 hour while the sodium salt deposited as a solid mass which on further stirring became a cream-colored paste. The suspension was cooled to 25°, filtered, washed with five 200 ml. portions of hot benzene and then with three 200 ml. portions of water. The sodium salt of 2-(p-tolylsulfonamido)-5-chlorobenzophenone was dried in vacuo at 80° C. to give a cream-colored powder. After recrystallization from a mixture of dimethyl formamide and chloroform it forms yellowish needles melting at 298–299° C.

*Example 18*

Part of the sodium salt described above was dissolved in hot 0.2 N sodium hydroxide. The solution was cooled, filtered, and acidified with dilute hydrochloric acid. The precipitate was allowed to solidify, filtered off, washed with water, and recrystallized from ethanol to give needles of 2-(p-tolylsulfonamido)-5-chlorobenzophenone, melting at 120–121°.

*Example 19*

A solution of 15.5 g. (0.0413 mole) of 2-(p-tosylamido)-5-chlorobenzophenone in 200 ml. of toluene was dried by distilling off 50 ml. of toluene. The solution was cooled to 65° and 11.5 ml. of a solution of 10 g. of sodium in 100 ml. of methanol was added. The clear yellow solution rapidly deposited the cream colored sodium salt. The methanol was distilled off and the reaction mixture was refluxed 1½ hours to ensure the complete formation of the sodium salt. About 10 ml. of toluene was distilled off at the end of the reflux period to remove any remaining methanol. To the reaction mixture 4.6 ml. (0.066 mole) of dimethyl sulfate was added and the stirring and refluxing was continued for 1 hour and 20 minutes. The excess dimethyl sulfate was destroyed by refluxing with 100 ml. of 3 N sodium hydroxide for 1½ hours. The mixture was cooled and the organic layer was separated, washed with water and concentrated in vacuo. The residue was crystallized from a mixture of benzene and petroleum ether to give the 2-(N-methyl-p-tolylsulfonamido)-5-chlorobenzophenone as colorless needles which after crystallization from ethanol, M.P. 151–152° C.

*Example 20*

To 200 ml. of 70% sulfuric acid heated to 105° C., 10 g. of 2 - (N-methyl-p-tolylsulfonamido)-5-chlorobenzophenone were added. The heating was continued and the mixture was stirred until a clear solution resulted. This took about 8 minutes, the heating being stopped at 145° C. The clear solution was poured over 1 liter of crushed ice and diluted with water. The yellow reaction product was filtered off, washed thoroughly with water and dried. On recrystallization from methanol, yellow prisms (M.P. 93–94°) or needles melting at 95–96° of 2-methylamino-5-chlorobenzophenone are obtained.

*Example 21*

A suspension of 31.5 g. (76.8 m. moles) of the sodium salt of 2-tosylamino-5-chlorobenzophenone was refluxed in 300 ml. of anhydrous acetonitrile with 13.3 ml. (18.7 g.=155 m. moles) of allyl bromide for 1½ hours. The creamy voluminous sodium salt soon reacted and a fine white precipitate of sodium bromide was formed. This was filtered off and the colorless solution was concentrated in vacuo to give a colorless oil. A solution of 25 g. of this oil in 40 ml. of glacial acetic acid was added to 300 ml. of 70% sulfuric acid at 105° C. The mixture was stirred and heated to 145° C. within 8 minutes. The resulting dark, clear solution was poured over 2 l. of crushed ice and diluted with ca. 1 l. of water. The gummy solid was dissolved in 1.5 l. of ether and the ether layer was washed with 1 N sodium hydroxide and then with water. The ether solution was dried, concentrated in vacuo and the residue was crystallized from 75 ml. of methanol to give 2-allylamino-5-chlorobenzophenone as

Example 22

A mixture of 61.2 g. (0.2 mole) of the sodium salt of 2 - (p - tolylsulfonamido)-5-chlorobenzophenone, 30 ml. (0.24 mole) of benzyl chloride and 0.5 g. of sodium iodide was refluxed with stirring in 250 ml. of acetonitrile. After 4 hours, the yellow voluminous sodium salt had changed to a white fine precipitate of sodium chloride. The refluxing was continued for another hour and then the sodium chloride was filtered off and the solution was concentrated in vacuo. The residue was dissolved in ether and washed with water to remove any mineral salts. The ether solution was dried and partly concentrated yielding large colorless prisms. Crystallization from hexane-ether yields colorless prisms of 2-(N-benzyl-p-tolylsulfonamido)-5-chlorobenzophenone, melting at 116–118° C.

Example 23

20 g. of the material obtained in Example 22 was added with stirring to 600 ml. of 70% sulfuric acid at 105° and the temperature was raised to 145° within 10 minutes. The reaction mixture was then poured over 1.5 l. of cracked ice and the gummy solid which was precipitated was taken up in ether. The ether solution was washed with sodium carbonate solution and water, dried over sodium sulfate and concentrated in vacuo to give a yellow oil. This was crystallized from ethanol to give 2-benzylamino-5-chlorobenzophenone. Recrystallization from ethanol gives yellow prisms melting at 86–87° C.

Example 24

A solution of 24.5 g. (0.1 mole) of 2-methylamino-5-chlorobenzophenone in 100 ml. of ether was mixed with 5.5 ml. (0.06 mole) of bromoacetyl bromide. The mixture was allowed to stand for 5 minutes and then washed with 100 ml. of water. After separating, the process was repeated with 2.2 mol. (0.025 mole) of bromoacetyl bromide and then with smaller portions until the yellow amine color had practically disappeared and further additions of acylating agent caused no perceptible change in color. A total of 0.18 mole of bromoacetyl bromide was used. The ether layer was dried and concentrated in vacuo. The oil was treated with water (to destroy unreacted bromoacetyl bromide) and hexane. The formed crystals were filtered off, washed with water, and then with hexane until colorless. The 2-(2-bromo-N-methyl-acetamido)-5-chlorobenzophenone obtained was crystallized from a mixture of ether and petroleum ether to yield colorless prisms melting at 95–96°.

Example 25

A solution of 5.0 g. of 2-(2-bromo-N-methylacetamido)-5-chlorobenzophenone in 22.5 ml. of methanol was added to 52.5 ml. of a 15% methanolic ammonia solution (wgt./vol.). This mixture was left for 45 minutes at room temperature, diluted with 75 ml. of methanol and left standing for an additional 2¼ hours. The mixture was then diluted with about 200 ml. of water and extracted with three 100 ml. portions of methylene chloride. The organic layer was washed free of ammonia, dried over sodium sulfate and allowed to stand at room temperature with charcoal for two hours. The solution was then concentrated in vacuo to an oil. The residue was crystallized from 25 ml. of ether yielding 7-chloro-1-methyl-5-phenyl-3H-1,4-benzodiazepin-2-(1H)-one; M.P. 125–126° (colorless plates).

Example 26

A solution of 6.5 g. (26.6 m. moles) of 2-methylamino-5-chlorobenzophenone and 10 g. (71.4 m. moles) of glycine ethyl ester hydrochloride in 70 ml. of pyridine was heated to reflux temperature. Some pyridine (10 ml.) was distilled off initially and the refluxing was continued for 16 hours. Then, while the volume was kept constant by the addition of fresh solvent, 60 ml. of pyridine was distilled off within 6 hours. The pyridine was then removed in vacuo and the residue was partitioned between 100 ml. each of water and ether. The ether layer was further washed with water and then dried and treated with charcoal. The resulting yellow solution was concentrated in vacuo to give an oil which on crystallization from methanol yielded some starting material. The mother liquor was concentrated in vacuo to an oil and crystallized from ether to give 7-chloro-1-methyl-5-phenyl-3H-1,4-benzodiazepin-2-(1H)-one, melting at 125–126°.

Example 27

A solution of 3.07 g. (11.3 m. moles) of 2-allylamino-5-chlorobenzophenone in 100 ml. of ether was treated with 1.1 ml. (6 m. moles) of bromoacetyl bromide. The ether solution was then washed with 100 ml. of water. This process was repeated once with 0.5 ml. and then 3 times with 0.3 ml. of bromoacetyl bromide. The ether solution was finally washed with water until neutral, dried over sodium sulfate and concentrated to give colorless 2-(2-bromo-N-allylacetamido)-5-chlorobenzophenone which on recrystallization from hexane gave colorless flat prisms melting at 85–86° C.

Example 28

A solution of 3.2 g. of 2-(2-bromo-N-allylacetamido)-5-chlorobenzophenone in 25 ml. of methanol and 30 ml. of a 21% solution of ammonia in methanol was allowed to stand overnight at 25° C. The solution was concentrated in vacuo (water bath temperature 20–25° C.). To the residue 100 ml. of ether was added and the theoretical amount of ammonium bromide was filtered off. The ether solution was treated with charcoal for 1 hour, filtered, concentrated in vacuo, and the residue was crystallized from a mixture of ether and petroleum ether (1:9). This yielded 1 - allyl - 7 - chloro-5-phenyl-3H-1,4-benzodiazepin - 2 - (1H) - one. Recrystallization from hexane gives colorless clusters of prisms melting at 105–106° C.

Example 29

A solution of 3.22 g. (10 m. moles) of 2-benzylamino-5-chlorobenzophenone in 100 ml. of ether was treated with 0.54 ml. (6 m. moles) of bromoacetyl bromide. After standing for 2–3 minutes, the ether solution was washed with 100 ml. of water. This procedure was repeated with first 0.36 ml. (4 m. moles) and then with three 0.18 ml. (2 m. moles) portions of bromoacetyl bromide. The ether solution was then washed thoroughly with water and a first crop melting at 159–160° crystallized out. A second crop was obtained on concentrating the ether solution. On recrystallization from chloroform-hexane mixture colorless prisms of 2-(2-bromo-N-benzylacetamido)-5-chlorobenzophenone melting at 159–160° C. are obtained.

Example 30

A solution of 2.27 g. (6.14 m. moles) of 2-(2-bromo-N-benzylacetamido)-5-chlorobenzophenone in 120 ml. of ether and 60 ml. of a 13% wt./vol. solution of ammonia in methanol was allowed to stand for 18 hours at room temperature. The resulting slightly yellow solution was concentrated in vacuo with a bath temperature below 25° C. The residue was partitioned between 100 ml. each of ether and water. The ether solution was dried over sodium sulfate and concentrated yielding almost colorless 1 - benzyl - 7 - chloro - 5 - phenyl - 3H - 1,4-benzodiazepin-2-(1H)-one melting at 173–174° C.

Example 31

To a solution of 27.2 g. (0.07 mole) of 2-tosylamido-5-chlorobenzophenone in 300 cc. of toluene was added a solution of 2 g. (0.084 mole) of sodium in 20 cc. of methanol. The methanol was distilled off and the mixture was refluxed with stirring for 1–5 hours. After cooling, 21.8 g. (19.1 cc., 0.14 mole) of diethyl sulfate was added and refluxing with stirring was continued for 3 hours. The excess of diethyl sulfate was destroyed by refluxing with 240 cc. of 0.5 N sodium hydroxide for 1½ hours. The organic layer was washed with water and concentrated in vacuo. The residual oil was dissolved in ether and purified by repeated washing with 0.2 N sodium hydroxide and finally with water. The ether solution was dried and concentrated to an oil.

The oil was dissolved in the minimum volume of glacial acetic acid (ca. 15 cc.) and added to 200 cc. of 70% sulfuric acid (prepared by mixing 140 cc. concentrated sulfuric acid with 75 cc. water) at 105° C. This mixture was stirred and heated within 10 minutes to ca. 145° C. and the resulting clear solution was poured over 1.5 liters of crushed ice. The precipitated 2-ethylamino-5-chlorobenzophenone was allowed to crystallize, filtered off, washed with water and dried. After recrystallization from methanol, the product forms yellow prisms melting at 56–57°.

Example 32

2-amino-5-chloro-2'-methylbenzophenone (21 g.) was dissolved in 400 ml. ether and pyridine (6 ml.) and bromoacetylbromide (21 g.) dissolved in ether (50 ml.) was slowly added. After 2 hours the ether was washed several times with water and concentrated. The 2-(2-bromoacetamido)-5-chloro-2'-methylbenzophenone forming white crystals melting at 137–8° was filtered off.

Example 33

2-amino-2',5-dichlorobenzophenone (26.5 g.) was dissolved in pyridine (200 ml.) and tosylchloride (25 g.) added. The mixture was refluxed for 1 hour and left at room temperature overnight. After pouring the solution into water, crystals of 2',5-dichloro-2-(p-toluenesulfonamido)-benzophenone were collected and recrystallized from ethanol, M.P. 136–138°.

Example 34

2',5-dichloro-2-(p-toluenesulfonamido)-benzophenone (31 g.) was dissolved in 1 N methanolic sodium methoxide solution (80 ml.) and enough methanol to produce a clear solution. The methanol then was removed in vacuo and the residue dissolved in dimethylformamide (200 ml.). On addition of methyl-iodide (25 ml.) the temperature of the solution increased to 30°. After 1 hour standing at room temperature the main amount of solvent was distilled off in vacuo and the residue poured into water. Crystals were collected and recrystallized to give 2',5-dichloro-2-(N-methyl-p-toluenesulfonamido)-benzophenone melting at 145°. After resolidification the M.P. is 153–5°.

Example 35

2',5-dichloro-2(N-methyl-p-toluenesulfonamido)-benzophenone was hydrolyzed in a mixture made of concentrated sulfuric acid (325 ml.), acetic acid (250 ml.) and ice (75 g.). After refluxing for 20 hours the mixture was poured on ice, and extracted with ether. All acids were removed by shaking the ether with 2 N NaOH. Concentrating the ether and addition of hexane yielded yellow crystals of 2',5-dichloro-2-methyl-aminobenzophenone, M.P. 78–80°. After resolidification the material melted at 88–90°.

Example 36

A mixture of 23.5 g. (0.094 m.) of 2-amino-5-chloro-2'-fluorobenzophenone and 21.5 g. (0.113 m.) of p-toluenesulfonyl chloride was dissolved in 100 ml. of pyridine and refluxed for ninety minutes. After distillation of 50 ml. of pyridine, the residue was poured into 250 ml. of water and stirred until the oil had solidified (thirty minutes). The precipitate was filtered and washed with 600 ml. of hot water followed by 300 ml. of petrol (B.P. 30–40° C.). The residue was recrystallized from methanol to give 2-p-toluenesulfonamido-5-chloro-2'-fluorobenzophenone, yellow prisms M.P. 119–120° C.

Example 37

A solution of sodium methoxide (0.0206 m.) in methanol was added to a solution of 8.3 g. (0.026 m.) of 2-p-tolylsulfonamido-5-chloro-2'-fluorobenzophenone in 75 ml. of toluene. The mixture was refluxed for thirty minutes and 15 ml. of toluene was distilled off. The mixture was refluxed a further fifteen minutes and an additional 10 ml. of toluene was distilled off to remove traces of water and methanol. The precipitated sodium salt was dissolved by the addition of 10 ml. of N,N-dimethyl formamide. The mixture was then cooled to room temperature and two equivalents of dimethyl sulfate were added. The solution was then refluxed for 30 minutes, cooled, washed twice with 50 ml. of 5 N sodium hydroxide solution, twice with 50 ml. of water, and finally twice with 50 ml. of brine. The toluene solution was evaporated to dryness, and the pale yellow crystalline residue was recrystallized from methanol to give 2-(N-methyl-p-tolylsulfonamido)-5-chloro-2'-fluorobenzophenone as white needles, M.P. 151–152° C.

Example 38

To 200 ml. of 70% (w./v.) sulfuric acid preheated to 105° C., 10 g. of the N-methyl tosyl derivative prepared in Example 37 was added and the mixture stirred and heated to 145° C. until a clear solution resulted (approximately eight minutes). The mixture was poured over 1 kg. of crushed ice and the yellow reaction product filtered off, washed thoroughly with water, and recrystallized from methanol to give 2-methylamino-5-chloro-2'-fluorobenzophenone as yellow needles, M.P. 119–120°.

Example 39

150 cc. of benzoyl chloride was introduced with stirring at 120° into 100 g. of 3,5-dichloroaniline. The temperature was elevated to 180°, and 100 grams of anhydrous zinc chloride was added; the melt was heated to 230–242° for 2 hours and then poured into 250 cc. of 1 N hydrochloric acid. The mixture was refluxed and cooled. The resinous material was then separated and dissolved in a mixture of 600 cc. acetic acid and 1.2 l. 70% (by volume) sulfuric acid. The solution was refluxed for 3 hours, cooled, made alkaline with 50% potassium hydroxide, and extracted with ether. The aqueous layer was rejected, and the ether layer washed with an excess of 2 N HCl. The ether layer was then dried and concentrated. After recrystallization from petroleum ether, the residue forms yellow prisms of 2-amino-3,5-dichlorobenzophenone melting at 93–94°.

Example 40

To 1.38 liters of benzoyl chloride heated to 120° was added, with stirring and continued heating, 566 g. of 4-chloro-2-methylaniline. At a temperature of 180°, 800 g. of zinc chloride was introduced. The temperature was then raised to 220–225° and maintained there for 1.5 hours and then decreased to about 150°. 2 liters of 3 N hydrochloric acid was cautiously added and the biphasic mixture was refluxed for about 5 minutes. The hot aqueous layer was decanted and the residue washed once more with the same amount of 3 N hydrochloric acid.

The residue was refluxed for 15 hours with a mixture of 600 cc. of glacial acetic acid, 375 cc. of water and 700 cc. of concentrated sulfuric acid. The reaction mixture was poured on ice and extracted with methylene chloride. The methylene chloride extract was washed with water, dilute alkali, dilute hydrochloric acid, separated, dried and concentrated in vacuo to dryness. The residue was crystallized from petroleum ether to yield the crude product. Upon recrystallization from a mixture of ether and petroleum ether, the purified 2-amino-3-methyl-5-chlorobenzophenone formed yellow needles melting at 88.5–90°.

A mixture of 5.0 g. of activated charcoal (Norite-SG), 100 mls. of tetrahydrofuran, 5.0 mls. of 5% palladous chloride solution, 15.0 g. of powdered potassium acetate and 24.6 g. of 2-amino-3-methyl-5-chlorobenzophenone was shaken in a closed vessel in a hydrogen atmosphere (2 atmospheres pressure) until 0.1 mole of hydrogen was absorbed (5–6 hours). The mixture was then filtered and the yellow filtrate evaporated to a syrup in vacuo. The syrup was dissolved in methylene chloride and the solution washed with 3 N hydrochloric acid. The solvent layer was dried and evaporated in vacuo. The oily residue was crystallized from petroleum ether (B.P. 30–50°) to give purified 2-amino-3-methylbenzophenone melting at 51–52°.

To an ice cold solution of 27.6 g. of 2-amino-3-methylbenzophenone in 200 cc. benzene was added, in portions with stirring, 14 cc. of bromoacetyl bromide and 155 cc. of 1 N sodium hydroxide at such a rate as to keep the mixture slightly acidic. The organic layer was then separated and washed with dilute alkali and water. The benzene solution was then dried, concentrated in vacuo to a small volume, and diluted with ether and petroleum ether. The precipitated crystals of 2-bromoacetamido-3-methylbenzophenone melted at 117–118°.

A solution of 18.2 g. of 2-bromoacetamido-3-methylbenzophenone in 300 cc. of liquid ammonia was stirred at atmospheric pressure until the ammonia had evaporated (about 5 hours). The residue was dissolved in benzene and washed with water. The organic layer was dried and concentrated in vacuo. The residual syrup was dissolved in pyridine, refluxed for 3 hours and concentrated in vacuo to dryness. The residue was crystallized from a mixture of benzene and petroleum ether yielding the crude 9-methyl-5-phenyl-3H-1,4-benzodiazepin-2(1H)-one which was recrystallized from a mixture of methylene chloride and petroleum ether. It formed colorless prisms

*Example 41*

160 g. of o-fluorobenzoic acid chloride was heated with stirring to 110°. To this was added, over a period of about 30 minutes, 47.2 g. of p-toluidine. The resulting mixture was slowly heated within 30 minutes to 180°. Then, 100 g. of zinc chloride was added over a period of about 30 minutes. To complete the reaction, the mixture was gradually heated within 1 hour to 225–230° and kept for 2 hours at this temperature. After the reaction mixture had cooled to 100°, 800 ml. of hot water was slowly added and the resulting mixture refluxed for 15 minutes. The hot aqueous phase was siphoned off. This extraction with hot water was repeated 3 times. The residual brown, water insoluble solid was hydrolyzed by refluxing for 6 hours with a mixture of 70 ml. of water, 100 ml. of acetic acid and 130 ml. of concentrated sulfuric acid. The resulting reaction mixture was diluted with water and extracted with a mixture of ether and petroleum ether. The organic layers were washed 4 times with water, 3 times with 3 N sodium hydroxide and again 3 times with water. After drying over sodium sulfate, the organic extracts were concentrated in vacuo to yield crude 5-methyl-2-amino-2'-fluorobenzophenone which upon crystallization from benzene-hexane melted at 68.5–69.5° (yellow needles).

*Example 42*

39 g. of o-chlorobenzoyl chloride was warmed to 110°. With stirring 10.7 g. of p-toluidine was added and the mixture heated to 180°. Then 20 g. of anhydrous zinc chloride was added and the temperature raised to 220° during 1 hour. After cooling to 130°, 200 ml. of water was added and the mixture heated to reflux for 5 minutes with vigorous stirring. The hot water layer was then decanted and the procedure was repeated 3 times.

The water-insoluble residue was then refluxed for 10 hours with a mixture of 25 ml. of water, 35 ml. of acetic acid and 50 ml. of concentrated sulfuric acid. The resulting dark solution was cooled, poured into ice-water and the mixture extracted with ether. The ether solution was shaken with 2 N sodium hydroxide. Concentration of the dark ether solution yielded 5-methyl-2-amino-2'-chlorobenzophenone as a yellow oil which after three crystallizations from hexane melted at 106–107°.

A mixture of 30 g. of 5-methyl-2-amino-2'-chlorobenzophenone, 200 ml. of pyridine, 3 ml. of piperidine and 50 g. of glycine ethyl ester hydrochloride was heated to reflux for 17 hours. The solvent was then evaporated in vacuo and the residue treated with water and extracted with ether. The ether extract was dried with sodium sulfate and concentrated to yield a yellow oil which was chromatographed on 700 g. of neutral aluminum oxide, activity III. A first elution was performed with benzene-petroleum ether (1:1). Further elution with ether yielded white crystals of 7-methyl-5-(2-chlorophenyl)-3H-1,4-benzodiazepin-2(1H)-one, which after several recrystallizations from methanol, melted at 223–224°.

*Example 43*

50.0 g. of 2-amino-5-chloro-2'-fluorobenzophenone in 300 cc. of tetrahydrofuran was hydrogenated at atmospheric pressure in the presence of 10 g. of charcoal (Norite), 30.0 g. of potassium acetate and 2.5 cc. of a 20% palladous chloride solution (20% by weight of palladium). After an initiation period varying from ten minutes to an hour, hydrogen uptake was rapid and stopped completely after the absorption of the theoretical amount. Filtration of the catalyst over a "Hyflo" pad and removal of the solvent left a yellow crystalline residue. The crude mixture of ketone and potassium acetate was partitioned between methylene chloride (300 cc.) and water (1 l.). The layers were separated and the water layer washed with methylene chloride (3×50 cc.). The organic layers were combined, washed with 3 N sodium hydroxide solution (2×50 cc.), water (3×100 cc.), saturated brine solution (3×100 cc.), dried over anhydrous sodium sulfate and filtered. The solvent was removed and the product recrystallized from ethanol to give 2-amino-2'-fluorobenzophenone as yellow prisms melting at 126–8°.

*Example 44*

A mixture of 2-amino-2'-fluorobenzophenone and p-toluenesulfonyl chloride (3.2 g.) was dissolved in pyridine (15 cc.) and refluxed for ninety minutes. A total of two thirds of the pyridine was removed by distillation and the residue poured into water (500 cc.). The mixture was stirred until the product had solidified, and then filtered. The precipitate was dissolved in methylene chloride (50 cc.), and the resulting solution washed with 2 N hydrochloric acid (3×25 cc.), water (3×25 cc.), saturated brine solution (2×50 cc.), dried over anhydrous sodium sulfate treated with Norite and filtered. Removal of the solvent and crystallization of the residue from ethanol gave 2-p-toluenesulfonamido-2'-fluorobenzophenone as white needles melting at 129.5–130°.

*Example 45* p-Fluorobenzoyl chloride (66 g.) was heated in a 2 l. three neck round bottom flask, fitted with a thermometer, condenser and stirrer, to 160° and p-chloraniline (24 g.) was then added thereto. The temperature was raised to 200° and zinc chloride (33 g.) was introduced. The temperature was maintained at 200–210° for one hour and then the reaction was quenched by the careful addition of 250 cc. of 3 N hydrochloric acid. The resulting mixture was refluxed for a few minutes and the acid portion decanted. The process of boiling with 250 cc. portions of 3 N hydrochloric acid was repeated three times. The residue was then hydrolyzed by refluxing in 500 cc. of concentrated hydrochloric acid for 17 hours. The mixture was cooled and made alkaline with 10 N sodium hydroxide, keeping the temperature below 30° by external cooling. The resulting yellow precipitate was filtered, dissolved in methylene chloride (300 cc.) and washed with 3 N hydrochloric acid (3×100 cc.). The organic layer was washed acid free with water (4×50 cc.), dried over anhydrous sodium sulfate, filtered and concentrated to an oil. The residue was dissolved in 2 l. of hexane, filtered, concentrated to 500 cc. and allowed to crystallize. The crystals were filtered to give yellow needles of 2-amino-5-chloro-4'-fluorobenzophenone melting at 108–9°.

*Example 46*

A mixture of 2-amino-5-chloro-4'-fluorobenzophenone (3.0 g.) and p-toluenesulfonyl chloride (2.8 g.) in pyridine (15 cc.) was refluxed for 90 minutes. Two thirds of pyridine was removed by distillation and the residue poured into 1 l. of water and stirred for one hour. The crystalline residue was filtered, dissolved in methylene chloride (150 cc.) and the solution washed with 3 N hydrochloric acid (2×25 cc.), water (3×50 cc.), saturated brine solution (2×50 cc.), dried over anhydrous sodium sulfate and filtered. Methylene chloride was removed and the residue recrystallized from methanol to give 2-p-toluene-sulfonamido-5-chloro-4'-fluorobenzophenone as white prisms melting at 126–8°.

*Example 47*

A mixture of 50 g. of 2-amino-5-bromo-2'-fluorobenzophenone and 38.8 g. of p-toluenesulfonyl chloride was refluxed in 200 ml. of pyridine for 90 minutes. The pyridine was then distilled off until the volume was reduced to 100 ml., the residue poured into 250 ml. of water and stirred. The resulting precipitate was filtered off and washed with 600 ml. of hot water followed by 300 ml. of petroleum solvent (B. 30–40°). The resulting product was crystallized from methanol to give 2-p-toluenesulfonamido-5-bromo-2'-fluorobenzophenone as white prisms melting at 114–115°.

A mixture of 2-(p-toluenesulfonamido)-5-bromo-2'-fluorobenzophenone (5.0 g.), sodium methoxide in methonal (2.54 cc. 0.0044 m./cc.) and toluene (25 cc.), was stirred at room temperature for thirty minutes. Dimethyl sulfate (2.8 cc.) was added and the solution stirred for two hours. Excess dimethyl sulfate was then decomposed by the addition of 3 N sodium hydroxide solution (25 cc.) and stirring for a further ten minutes. The two layers were separated and the water layer extracted with methylene chloride (2×25 cc.). The organic layers were combined, washed with 3 N sodium hydroxide solution (3×25 cc.), water (3×50 cc.), saturated brine solution (2×50 cc.), dried over anhydrous sodium sulfate and filtered. Removal of the solvent gave an oil which was crystallized from ethanol to give white needles of 2-(N-methyl-p-toluenesulfonamido)-5-bromo-2'-fluorobenzophenone melting at 154–5°.

2-(N-methyl-p-toluenesulfonamido)-5-bromo-2'-fluorobenzophenone (3.2 g.) was dissolved in 40 cc. of an 80% (v./v.) sulfuric acid solution at 105°. Heating was continued until the temperature reached 145° and the solution was then poured over 500 g. of crushed ice. The solution was diluted to 1 l. with water and filtered. The obtained yellow precipitate was washed well with water, and dissolved in methylene chloride (50 cc.). The solution was dried over anhydrous sodium sulfate, filtered and the solvent removed giving a yellow oil which was crystallized from hexane yielding yellow needles of 2-N-methylamino-5-bromo-2'-fluorobenzophenone melting at 112–113°.

*Example 48*

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

To a solution of 42 g. of 2-amino-2'-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl)acetanilide melting at 119–121°.

To a solution of 14.5 g. of 2-bromo-2'-(2-chlorobenzoyl)acetanilide in 100 ml. of tetrahydrofuran, an excess of liquid ammonia (ca. 150 ml.) was added. The ammonia was kept refluxing with a Dry-Ice condenser for 3 hours after which time the ammonia was allowed to evaporate and the solution was poured into water. Crystals of 2-amino-2'-(2-chlorobenzoyl)acetanilide were collected, which after recrystallization from ethanol melted at 162–164°.

A solution of 3 g. of 2-amino-2'-(2-chlorobenzoyl)acetanilide in 50 ml. of pyridine was refluxed for 24 hours after which time the pyridine was removed in vacuo. The residue was recrystallized from methanol and a mixture of dichloromethane and ether giving crystals of 5-(2-chlorophenyl)-3H-1,4-benzodiazepin-2(1H)-one melting at 212–213°.

*Example 49*

A mixture of 5.7 mm. of 2-amino-5-chloro-2'-fluorobenzophenone and 6.8 mm. of p-toluenesulfonyl chloride in 15 ml. of pyridine was refluxed for 90 minutes. About half of the pyridine was then distilled off, the residue poured into 50 ml. of water and extracted with methylene chloride (3×25 ml.). The combined methylene chloride extracts were then washed with 2 N hydrochloric acid (2×50 ml.), water (2×25 ml.), saturated brine (2×25 ml.), dried over anhydrous sodium sulfate and filtered. Removal of the solvent gave an oil which was crystallized from ethanol to yield 2-p-toluenesulfonamido-5-chloro-2'-fluorobenzophenone as white needles melting at 132–133°.

*Example 50*

To 1.125 moles of m-toluyl chloride heated to 120° was added in portions with stirring 0.5 mole of p-chloroaniline. The mixture was then heated to 180–200° and 0.64 mole of zinc chloride was added. The temperature was gradually increased to 220–230° and kept there until the hydrogen chloride evolution had ceased (1–2 hours). After cooling to 120°, 500 ml. of 3 N hydrochloric acid was cautiously added and the mixture stirred and heated to reflux. The hot acidic layer was decanted and this procedure repeated 2 or 3 times.

The water insoluble residue was refluxed for 16 hours with a mixture of 350 ml. of concentrated hydrochloric acid and 350 ml. of glacial acetic acid. The mixture was concentrated in vacuo and diluted with water. The organic material was extracted with four 300 ml. portions of methylene chloride, which were subsequently washed with 500 ml. portions of 3 N hydrochloric acid to remove the p-chloroaniline, and three 500 ml. portions of 5 N sodium hydroxide solution to remove the benzoic acid. The methylene chloride extract was dried over anhydrous sodium sulfate and the solvent removed to give crude 2-amino - 5-chloro-3' - methyl-aminobenzophenone which was purified by chromatography in ether solution on a 10 fold amount of activated alumina. It was crystallized from a mixture of ether and petroleum ether (B.P. 30–60°) and formed yellow prisms melting at 90–91°.

A solution of 7.3 g. of 2-amino-5-chloro-3'-methylbenzophenone and 7 g. of glycine ethylester hydrochloride in 100 ml. of pyridine was refluxed for 20 hours. During the first few hours about 10 ml. of the solvent was slowly distilled off at atmospheric pressure. After 20 hours, the mixture was concentrated in vacuo and the residue taken up in a mixture of ether and water. The organic layer was separated, dried and concentrated in vacuo to dryness. The residue was crystallized from a mixture of benzene and petroleum ether and yielded 7-chloro-5-m-tolyl-3H-1,4-benzodiazepin-2(1H)-one which upon being recrystallized from the same solvent mixture formed colorless plates melting at 198–199°.

*Example 51*

A solution of 12.25 g. of 2-methylamino-5-chlorobenzophenone in 200 cc. of ether was treated with a total of 11.3 cc. of chloroacetyl chloride in several small portions. After each addition the reactants were allowed to stand for approximately five minutes and then, after washing the ether solution with water, the process was repeated. On completion of the addition the ether layer was washed with water, then with 5 percent sodium bicarbonate solution until neutral, and finally with water. Crystallized material was filtered off, washed with hexane and crystallized from methanol yielding 2-chloro-N-methylacetamido-5-chlorobenzophenone as colorless prisms melting at 123–124°.

A solution of 12 g. of 2-chloro-N-methylacetamido-5-chloro-benzophenone in 100 cc. of acetone was refluxed with 6.15 g. of sodium iodide for 20 minutes. After cooling, the mixture was filtered and the filtrate concentrated in vacuo. The residue was dissolved in a mixture of benzene and petroleum ether and the resulting solution filtered and then concentrated in vacuo to dryness. The residue was crystallized from a mixture of ethanol and petroleum ether and recrystallized from ether yielding 2-iodo-N-methylacetamido - 5 - chlorobenzophenone as colorless prisms melting at 95°.

A mixture of 5.0 g. of 2-iodo-N-methylacetamido-5-chloro-benzophenone in 22.5 ml. of methanol was added to 52.5 ml. of 15 percent methanolic ammonia solution (wt./vol.). This mixture was left for 45 minutes at room temperature then diluted with about 200 ml. of water and extracted with three 100 ml. portions of methylene chloride. The organic layer was washed free of ammonia, dried over sodium sulfate and allowed to stand at room temperature with charcoal for 2 hours. The solution was then filtered and concentrated in vacuo to an oil. The residue was crystallized from 25 ml. of ether yielding 7-chloro-1-methyl-5-phenyl-3H-1,4-benzodiazepin-2(1H)-one as colorless plates melting at 125–126°.

We claim:
1. A compound of the formula

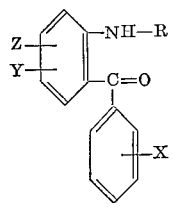

wherein R is chosen from the group consisting of lower alkyl, lower alkenyl and benzyl and X, Y and Z are chosen from the group consisting of hydrogen, halogen and lower alkyl, at least one of X, Y and Z being halogen.
2. 2-(N-lower alkylamino)-5-halobenzophenone.
3. 2-(N-methylamino)-5-chlorobenzophenone.
4. 2-(N-lower alkylamino)-5,2'-dihalobenzophenone.
5. 2-(N-methylamino)-5,2'-dichlorobenzophenone.

References Cited by the Examiner

UNITED STATES PATENTS

| | | | |
|---|---|---|---|
| 2,078,538 | 4/1937 | Kranzlein et al. | 260—570 |
| 2,818,433 | 12/1957 | Erickson | 260—570 |
| 2,828,341 | 3/1958 | Adams et al. | 260—570 |
| 2,893,992 | 7/1959 | Sternbach | 260—239 |
| 2,937,202 | 5/1960 | Slagh et al. | 260—556 |
| 2,948,753 | 8/1960 | Kranz | 260—556 |

FOREIGN PATENTS

| | | |
|---|---|---|
| 854,956 | 11/1960 | Great Britain. |
| 330,674 | 7/1958 | Switzerland. |

OTHER REFERENCES

Bell et al.: J. Chem. Soc. (London), vol. of 1955, pages 3560–3562.

Coldham et al.: J. Chem. Soc. (London), vol. of 1954, pages 4528–4532.

Diesbach et al.: Helv. Chim. Acta, vol. 35, pp. 2322–2332 (1952).

Dippy et al.: J. Chem. Soc. (London), vol. of 1952, pp. 2205–2210.

Dziewonski et al.: C.A., vol. 30, pages 2971–2972 (1936).

Huntress et al.: J.A.C.S., vol. 64, pages 2845–2849 (1942).

Migrdichian, "Organic Synthesis," vol. 2, pp. 1690–1695 (1957).

Miller et al.: J.A.C.S., vol. 57, pp. 2443–2446 (1935).

Montagne, Rec. Trav. Chem., vol. 36, pp. 258–270 (1916).

Mullholland, J. Chem. Soc. (London), vol. of 1954, pp. 4676–4681.

Ruggli et al.: Helv. Chim. Acta, vol. 24, pp. 703–716 (1941).

Tuemmler et al.: J.A.C.S., vol. 80, pp. 3772–3776 (1958).

Waters, J. Chem. Soc. (London), vol. of 1929, pp. 2106–2111.

Shah et al.: C.A., vol. 29, page 4755 (1935).

CHARLES B. PARKER, *Primary Examiner.*

IRVING MARCUS, *Examiner.*